US006002096A

United States Patent [19]

Hoffelner et al.

[11] Patent Number: 6,002,096

[45] Date of Patent: Dec. 14, 1999

[54] PLASMA TORCH WITH A SINGLE ELECTRODE PRODUCING A TRANSFERRED ARC

[75] Inventors: Wolfgang Hoffelner, Oberrohrdorf, Austria; Patric van der Haegen, Pratelln, Switzerland; Alex Zeman, Illzach, France

[73] Assignee: MGC-Plasma AG, Muttenz, Switzerland

[21] Appl. No.: 08/981,945

[22] PCT Filed: Feb. 21, 1997

[86] PCT No.: PCT/CH97/00065

§ 371 Date: Dec. 29, 1997

§ 102(e) Date: Dec. 29, 1997

[87] PCT Pub. No.: WO97/31509

PCT Pub. Date: Aug. 28, 1997

[30] Foreign Application Priority Data

Feb. 23, 1996 [CH] Switzerland .............................. 471/96

[51] Int. Cl.$^6$ ...................................................... B23K 10/00

[52] U.S. Cl. ................. 219/121.51; 219/75; 219/121.52; 313/231.51

[58] Field of Search ......................... 219/121.48, 121.36, 219/121.5, 121.51, 121.52, 121.59, 74, 75; 313/231.21, 221.41, 231.51

[56] References Cited

U.S. PATENT DOCUMENTS

| | | | |
|---|---|---|---|
| 5,262,616 | 11/1993 | Labrot et al. | 219/75 |
| 5,296,672 | 3/1994 | Ramakrishnan et al. | 219/121.52 |
| 5,374,802 | 12/1994 | Dorfman et al. | 219/121.52 |
| 5,688,417 | 11/1997 | Cadre et al. | 219/121.52 |

*Primary Examiner*—Mark Paschall
*Attorney, Agent, or Firm*—Michael J. Striker

[57] ABSTRACT

The plasma torch produces a transferred arc and has only one electrode integrated in the torch with the counter electrode being provided by the material being treated. The torch includes an outer housing (3), a single hollow electrode (5) arranged in the outer housing (3) and a gas vortex generator device (7) connected with the electrode. The gas vortex generator device (7) includes a rotationally symmetric ring (R) provided with at least two rows of throughgoing holes (10) axially spaced from each other and an impact wall (P) associated with an upper row of the throughgoing holes, so that a satisfactory two-part gas vortex flow is formed. By varying the gas pressure in an oscillating manner, the spot of the arc is continuously displaced in an axial direction (A). An additional gas feed (8) is provided so that gas can be fed axially directly to the plasma jet.

5 Claims, 1 Drawing Sheet

PLASMA TORCH WITH A SINGLE ELECTRODE PRODUCING A TRANSFERRED ARC

BACKGROUND OF THE INVENTION

The invention relates to a plasma torch with a transferred electric arc, a device for delivering the plasma gas in a vortex, thermal insulation on the outside of the torch, and an equal potential between the torch nozzle and the metal outer housing of the torch.

Plasma torches are realized by stabilizing an electric arc in a carrier gas. The simplest way to do this is to use a graphite electrode with an axial bore, through which the carrier gas flows into the electric arc that develops between the electrode and the material being melted. Along with these graphite torches, there are also cooled metal torches. They can be divided into two categories, torches with a non-transferred arc (indirect torches) and torches with a transferred arc (direct torches). In indirect torches, the electrode and counter electrode are integrated in the torch. In direct torches, an electrode is disposed in the torch, and the counter electrode represents the material to be treated. The introduction of the plasma gas is done either axially, thereby bathing a bar-like electrode, or tangentially into a gap that is located below a cooled hollow electrode. A gas vortex forms in a spiral in this hollow electrode. The bottom point of the arc is thereby moved over the inside surface of the electrode, and as a result the most uniform possible electrode abrasion takes place. The known embodiments are very vulnerable to malfunction and tend to form vertical electric arcs. This leads to rapid destruction of the electrode and to torch failure.

In addition, very high thermal losses occur. In some embodiments, the rotation of the arc is reinforced by auxiliary magnetic fields. These torches are available in an indirect embodiment (for instance from Union Carbide/Linde and Westinghouse) or in a direct version (for instance, Plasma Energy Corp., Retech).

In direct gas vortex plasma torches, the spacing between the electrode and the counter electrode in industrial application is generally not constant, since the material to be treated provides the counter electrode. This is true particularly for waste treatment, where the material to be treated is not distributed uniformly. When gas or dust is produced or when conductive layers develop because of dust deposits or condensation on torch parts, additional problems in operation arise. Disturbances in the gas vortex occur, with resultant local severe abrasion of the electrode that reduces its service life. Conductive layers lead to parasitic currents, which lead to secondary arcs that damage the torch. If the torch is accidentally extinguished during operation (for instance upon contact with a relatively large amount of nonconductive charge material), the local suction effect of the gas vortex can cause dust to be aspirated into the torch, which soils it and makes for deficient plasma gas supply; this makes further operation impossible, and the torch can be destroyed.

SUMMARY OF THE INVENTION

It is an object of the invention to provide a plasma torch that overcomes the disadvantages of the known embodiments.

According to the invention the plasma torch with a transferred arc comprises an outer housing, a hollow electrode arranged in the outer housing and a gas vortex generator device including a rotationally symmetric ring associated with the hollow electrode and an impact wall associated with the symmetric ring. The rotationally symmetric ring is provided with at least two rows of circumferentially distributed throughgoing holes for delivery of a plasma gas to the electrode, the rows of throughgoing holes are arranged one above the other in an axial direction in the symmetric ring and an upper one of the at least two rows is associated with the impact wall, so that the plasma gas passing through the upper one of the at least two rows of the throughgoing holes impinges tangentially on the impact wall, whereby a two-part gas vortex flow is formed.

Various preferred embodiments of the plasma torch are described hereinbelow and in the appended claims.

In a preferred embodiment the plasma burner is provided with a nose connected to one end of the outer housing and to the symmetrical ring, whereby the gas vortex flow is divided into one part in the hollow electrode and another part in the nose. The outer housing and nose, between which the gas vortex generator device is arranged, are at an identical electrical potential.

In various embodiments it is advantageous to provide a heat-resistant thermal insulation on the outer surface of the outer housing. Also it is advantageous to provide a nozzle for an axial delivery or feed of plasma gas.

DESCRIPTION OF THE PREFERRED EMBODIMENT

Figure 1:
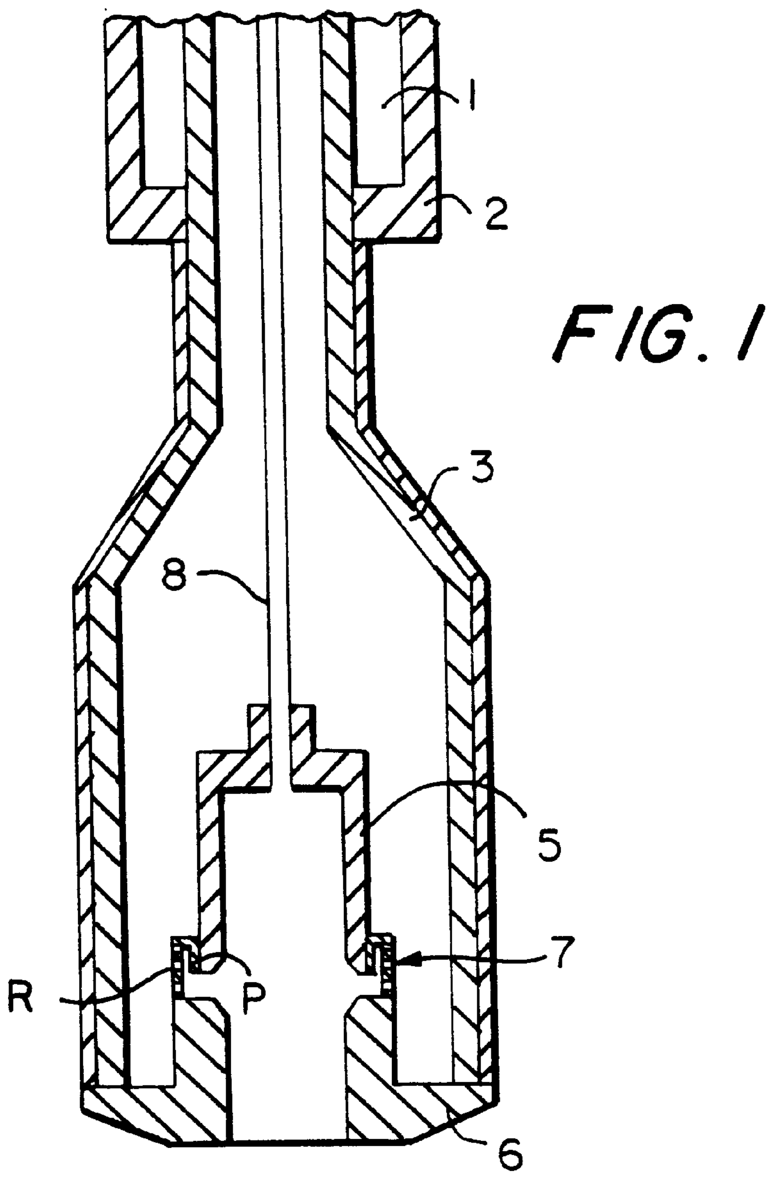
Figure 2:
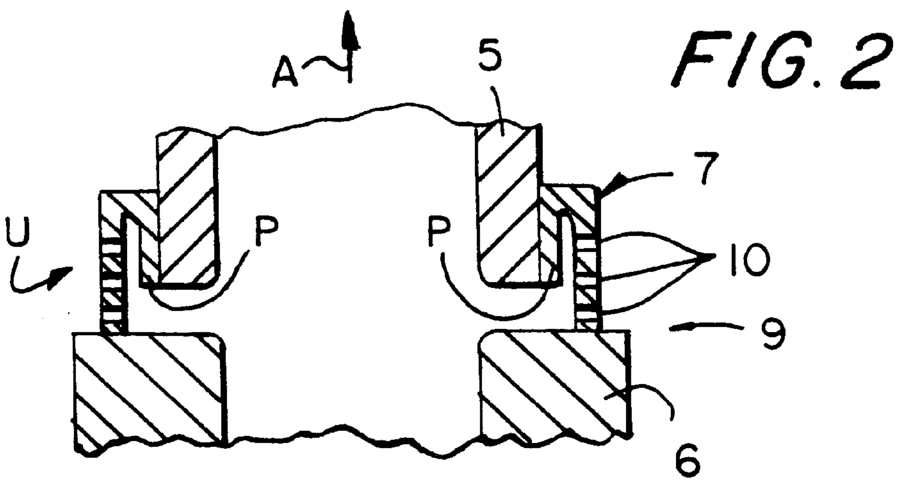

FIG. 1 shows one embodiment of a plasma torch with transferred arc according to the invention. It comprises a torch holder 1 surrounded with thermal insulation 2, an outer housing 3 covered with thermal insulation 4, a hollow electrode 5 in the outer housing 3, a nose 6 connected with one end of the outer housing 3 and a gas vortex generator device 7 arranged between the hollow electrode 5 and the nose 6. The gas vortex generator device 7 comprises a rotationally symmetrical ring R provided with two or more rows of throughgoing holes 10 through which a plasma gas 9 is blown in tangentially to form a gas vortex flow. The throughgoing holes 10 are distributed around the circumference of the ring R and the rows are spaced one above the other in an axial direction A. The nozzles are disposed in the same direction. The nozzles are arranged so that they produce a gas flow through an upper row U of the rows of throughgoing holes 10 that is tangential to an impact wall P interior to and space from the ring R. As a result, in contrast to known torches of this type, the gas vortex flow is split into two parts. One part develops in the hollow electrode 5, while the other part is stabilized in the nose 6. The result is a very stable vortex configuration. While in conventional direct torches, spacing fluctuations between the nose and the material to be treated disturb the development of the vortex and thus lead to locally increased electrode erosion, the vortex development remains unimpaired by this in the multi-row gas vortex generator. This assures homogeneous abrasion of the hollow electrode 5. These provisions of the invention lengthen the service life of the electrode 5 by a factor of at least 10. The location of the abrasion in the axial direction can be adjusted by means of the gas velocity. In order to keep the abrasion surface as wide as possible in the axial direction as well, the plasma gas is blow n in at an alternating pressure that varies from a constant pressure. The amplitudes and frequencies can be programmed in accordance with the gas vortex generator and the torch voltage. Gas can also be blown in an axial direction A, as needed, through the nozzle 8. As a result, if the arc fails, a rapid gas flow out of the torch can be obtained very quickly, preventing soiling. The outer torch housing and the nose are at the same electrical potential. This prevents leakage currents between the nose 6 and the outer torch housing 3 and thus prevents harmful spark-over. In order to prevent conductive deposits on the metal surface of the cooled outer torch housing and thus to prevent spark-over between the torch housing and the torch holder, the outer torch housing and the torch holder are provided with a thermally insulated protective layer. The embodiment of the torch according to the invention is equipped with a conventional ignition mechanism.

IN THE DRAWING

Additional reference characters have been added in RED to the sole figure. Approval of the changes in the figure is respectfully requested.

We claim:

1. A plasma torch with a transferred electric arc, said plasma torch comprising an outer housing (3);

a single hollow electrode (5) arranged in the outer housing (3); and a gas vortex generator device separate from said electrode, said gas vortex generator (7) including a rotationally symmetric ring (R) connected with said hollow electrode (5) and an impact wall (P) spaced from and interior to the symmetric ring (R);

wherein said rotationally symmetric ring (R) is provided with at least two rows of circumferentially distributed throughgoing holes (10) for delivery of a plasma gas to said electrode, said rows of said throughgoing holes are spaced from each other in an axial direction (A) in said symmetric ring (R) and an upper one (U) of said at least two rows is positioned with respect to said impact wall (P), so that said plasma gas passing through said upper one (U) of said at least two rows of said throughgoing holes (10) impinges tangentially on said impact wall (P);

whereby a two-part gas vortex flow is formed.

2. The plasma torch as defined in claim 1, further comprising a nose (6) connected to one end of the outer housing (3) and to said symmetrical ring (R), and wherein said outer housing (3) and said nose (6) are at an identical electrical potential, whereby said gas vortex flow is divided into one part in the hollow electrode (5) and another part in said nose (6).

3. The plasma torch as defined in claim 1, further comprising a heat-resistant thermal insulation (4) applied to an outer casing of said outer housing (3).

4. The plasma torch as defined in claim 1, further comprising a nozzle (8) providing a feed of said plasma gas into said hollow electrode (5) in said axial direction (A).

5. The plasma torch as defined in claim 1, further comprising means for delivering said plasma gas at a plasma gas pressure that oscillates around a constant pressure value and for controlling said plasma gas pressure, so that the plasma gas vortex oscillates in said axial direction (A).

* * * * *